United States Patent

Mizukami et al.

[11] Patent Number: 5,551,547
[45] Date of Patent: Sep. 3, 1996

[54] CLUTCH COVER ASSEMBLY

[75] Inventors: Hiroshi Mizukami; Hiroshi Uehara; Shinichi Okada, all of Neyagawa, Japan

[73] Assignee: Kabushiki Kaisha Daikin Seisakusho, Osaka, Japan

[21] Appl. No.: 359,078

[22] Filed: Dec. 19, 1994

Related U.S. Application Data

[62] Division of Ser. No. 103,455, Aug. 6, 1993, Pat. No. 5,400,887.

[30] Foreign Application Priority Data

Aug. 7, 1992 [JP] Japan .................................. 4-55619 U

[51] Int. Cl.⁶ ...................................................... F16D 13/71
[52] U.S. Cl. ..................... 192/89.23; 192/70.27; 192/109 A
[58] Field of Search ............................ 192/89.23, 89.22, 192/89.24, 70.27, 109 A, 109 B

[56] References Cited

U.S. PATENT DOCUMENTS

| | | |
|---|---|---|
| 2,183,001 | 12/1939 | Wolfram . |
| 2,246,231 | 6/1941 | Almen . |
| 3,785,466 | 1/1974 | Murai et al. . |
| 4,095,683 | 6/1978 | Ban . |
| 4,427,101 | 1/1984 | Maucher et al. ................. 192/89.23 X |
| 4,602,708 | 7/1986 | Nagano . |
| 4,641,736 | 2/1987 | Forster ................................ 192/89.23 |
| 4,678,071 | 7/1987 | Ball et al. . |
| 4,744,448 | 5/1988 | Maycock et al. . |
| 4,946,017 | 8/1990 | Flotow . |
| 4,949,829 | 8/1990 | Tojima et al. . |
| 4,951,553 | 8/1990 | Kohno . |
| 5,010,992 | 4/1991 | Maurer . |
| 5,022,508 | 6/1991 | Fukuda . |
| 5,088,583 | 2/1992 | Takeuchi et al. . |
| 5,088,584 | 2/1992 | Inaba et al. . |
| 5,333,713 | 8/1994 | Hagnere et al. ................. 192/89.23 X |
| 5,351,796 | 10/1994 | Uenohara ......................... 192/89.23 X |
| 5,385,224 | 1/1995 | Uehara ............................. 192/89.23 X |
| 5,400,887 | 3/1995 | Mizukami et al. .................. 192/89.23 |

FOREIGN PATENT DOCUMENTS

| | | |
|---|---|---|
| 2546999 | 12/1984 | France . |
| 1198214 | 8/1965 | Germany . |
| 1940681 | 2/1971 | Germany . |
| 2205455 | 8/1973 | Germany . |
| 3516152 | 6/1986 | Germany . |
| 3508869 | 9/1986 | Germany . |
| 3737628 | 5/1988 | Germany . |
| 3940218 | 6/1990 | Germany . |
| 943039 | 11/1963 | United Kingdom ................ 192/89.23 |
| 1187365 | 4/1970 | United Kingdom . |
| 2144496 | 3/1985 | United Kingdom . |
| 90/01642 | 2/1990 | WIPO . |
| 90/02287 | 3/1990 | WIPO . |
| 91/19113 | 12/1991 | WIPO . |
| 92/06312 | 4/1992 | WIPO . |

*Primary Examiner*—Andrea L. Pitts
*Attorney, Agent, or Firm*—Knobbe, Martens, Olson & Bear

[57] ABSTRACT

The clutch cover assembly comprises a clutch cover, a pressure plate, a washer-type spring and a lever member. The clutch cover is fixed to a flywheel. The pressure plate is located within said clutch cover and is fashioned with a pressing surface for clamping facings against the flywheel. The washer-type spring engages the pressure plate to the flywheel. The lever member, supported by the clutch cover, is for engaging the pressure plate in combination with the washer-type spring to the flywheel and for releasing engaging loads of the washer-type spring from the pressure plate.

3 Claims, 11 Drawing Sheets

CLUTCH COVER ASSEMBLY

This application is a divisional of application Ser. No. 08/103,455 filed on Aug. 6, 1993, now U.S. Pat. No. 5,400,887.

BACKGROUND OF THE INVENTION

The present invention relates to a clutch cover assembly, particularly to a clutch cover assembly including an elastic member for engaging a pressure plate to a flywheel.

The clutch cover assembly is fixed to a flywheel of the engine for transmitting driving force of the engine to a transmission side. The clutch cover assembly is mainly composed of a clutch cover fixed to the flywheel, a pressure plate within the clutch cover for clamping friction materials of a clutch disc between the flywheel and itself, and an elastic member for engaging the pressure place with the flywheel.

Generally, a diaphragm spring is used as the elastic member. This kind of diaphragm spring applies an engaging load on the pressure plate. The diaphragm spring must have a certain level of rigidity in order to function as a lever member which makes it difficult to obtain desirable engaging loads. That is, as shown in FIG. 12, as rigidity of the diaphragm spring becomes higher, allowable deflection (wear allowance) B becomes narrower and load fluctuation C becomes larger. In FIG. 12, an axis of abscissa is deflection S, an axis of ordinate is engaging load P, and the initial set load is shown as load A.

A clutch cover assembly is known in which a lever function and an engaging function are done separately. For example, a separate engaging member such as a coil spring or a washer-type spring is located within the clutch cover so as to apply an engaging force on the pressure plate.

In the clutch cover assembly mentioned above, it is difficult to obtain preferable load characteristics. That is, the allowable deflection is not large enough and the load fluctuation is too large, thus creating the peak mentioned above in FIG. 12. Particularly if a washer-type spring is employed, deflection is small with respect to load because it is difficult to ensure enough room for the washer type spring in the clutch cover.

SUMMARY OF THE INVENTION

It is an object of the present invention to obtain larger allowable wear and to reduce load fluctuation with respect to wear.

A clutch cover assembly according to an aspect of the present invention comprises a clutch cover, a pressure plate, an elastic member, and a lever member.

The clutch cover is fixed to an input rotation member. The pressure plate is located within the clutch cover for engaging a friction member with the input rotation member. The elastic member applies an engaging force on the pressure plate to engage the input rotation member. The lever member is supported by the clutch cover for engaging and releasing the load of the elastic member.

In this clutch cover assembly, combined urging loads of the elastic member and the lever member are applied to the pressure plate so that the pressure plate clamps the friction member to the input rotation member such as the engine flywheel.

It is possible to obtain larger allowable deflection and smaller load fluctuation with respect to deflection by reducing rigidity of the lever member.

It is also possible to flatten load characteristics by combining an elastic member having a peak of engaging load with a lever member having a low rigidity.

It is further possible to obtain larger allowable deflection by positioning the lever member and the elastic member in series, because deflection becomes larger by combining engaging loads favorably.

A clutch cover assembly according to another aspect of the present invention comprises a clutch cover, a pressure plate, a plurality of washer-type springs, and a lever member.

The clutch is fixed to an input rotation member. The pressure plate is located within the clutch cover for clamping a friction member to the input rotation member. The plurality of washer-type springs are arranged in series applying an engaging force for engaging the pressure plate with the input rotation member. The lever member, supported by the clutch cover, is for releasing the engaging load of the washer-type springs.

The plurality of washer-type springs in series makes it possible to obtain greater allowable deflection because deflection becomes, given favorably combined engaging loads, larger. However, the necessary space for washer-type springs is kept very small because of their arrangement in series.

The foregoing and other objects, aspects, and advantages of the present invention will become more apparent from the following detailed description.

DESCRIPTION OF THE PREFERRED EMBODIMENTS

The First Embodiment

Figure 1:
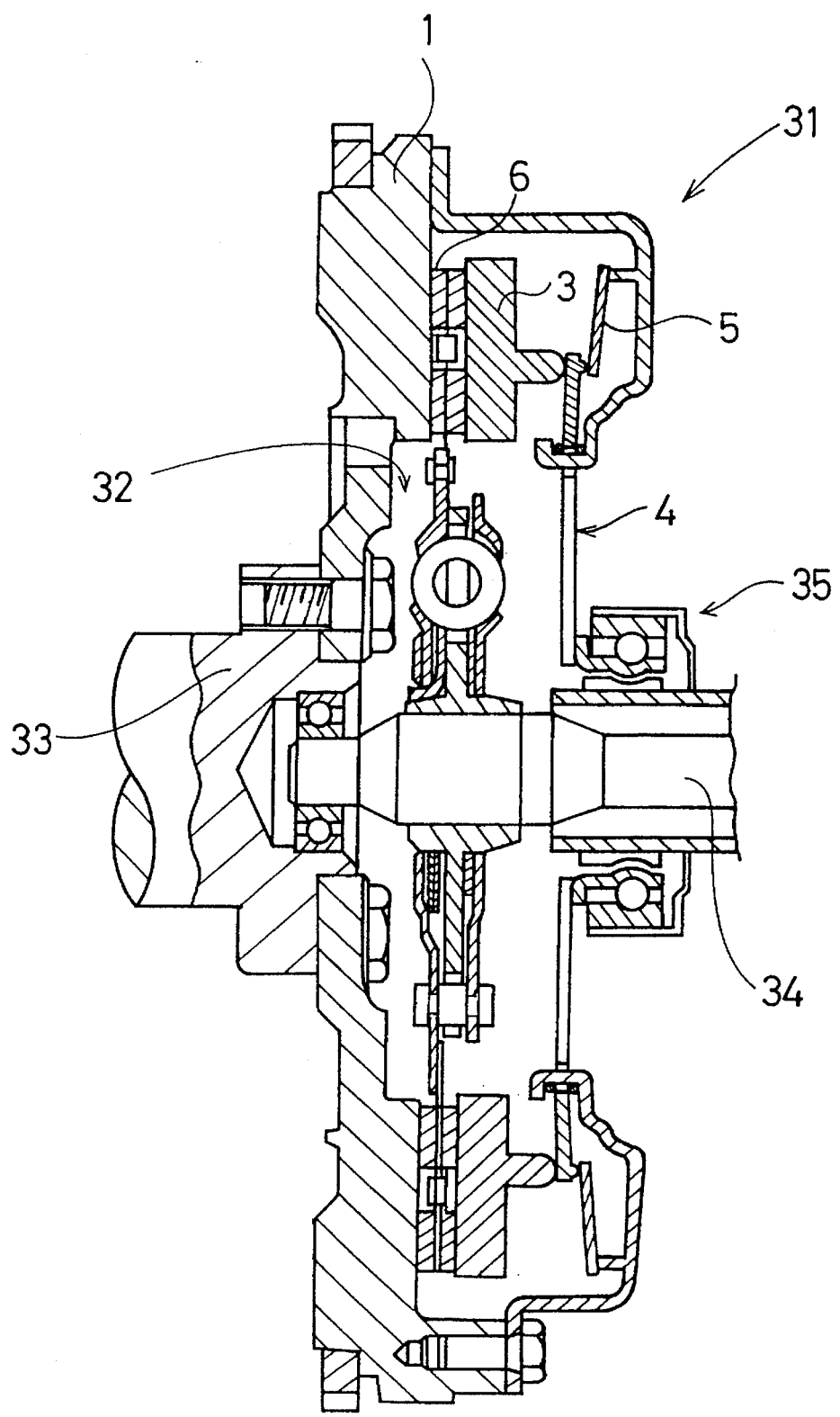
FIG. 1 is a schematic cross-sectional view of a clutch to which the first embodiment of the present invention is applied.
Figure 2:
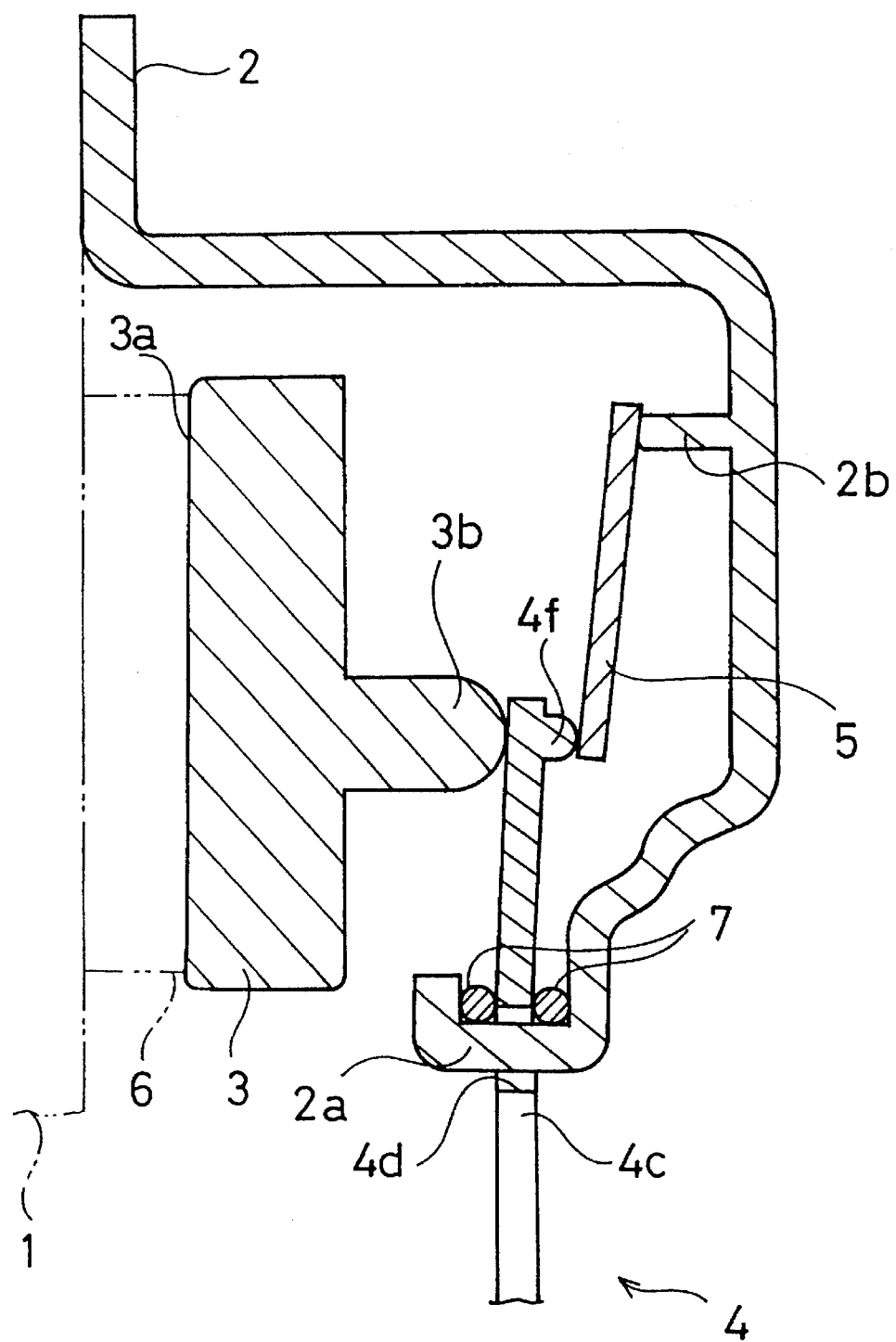
FIG. 2 is a schematic cross-sectional view of a clutch cover assembly.

FIG. 1 and FIG. 2 show a clutch device to which the first embodiment of the present invention is applied. The clutch device is mainly composed of a clutch cover assembly 31, a clutch disc assembly 32, and a flywheel 1 which is connected to a crankshaft 33 of the engine side. A main drive shaft 34 extending from a transmission (not shown) side is in spline engagement with the center of the clutch disc assembly 32. A release bearing 35 is located around the main drive shaft 34 so as to be movable axially.

Figure 3:
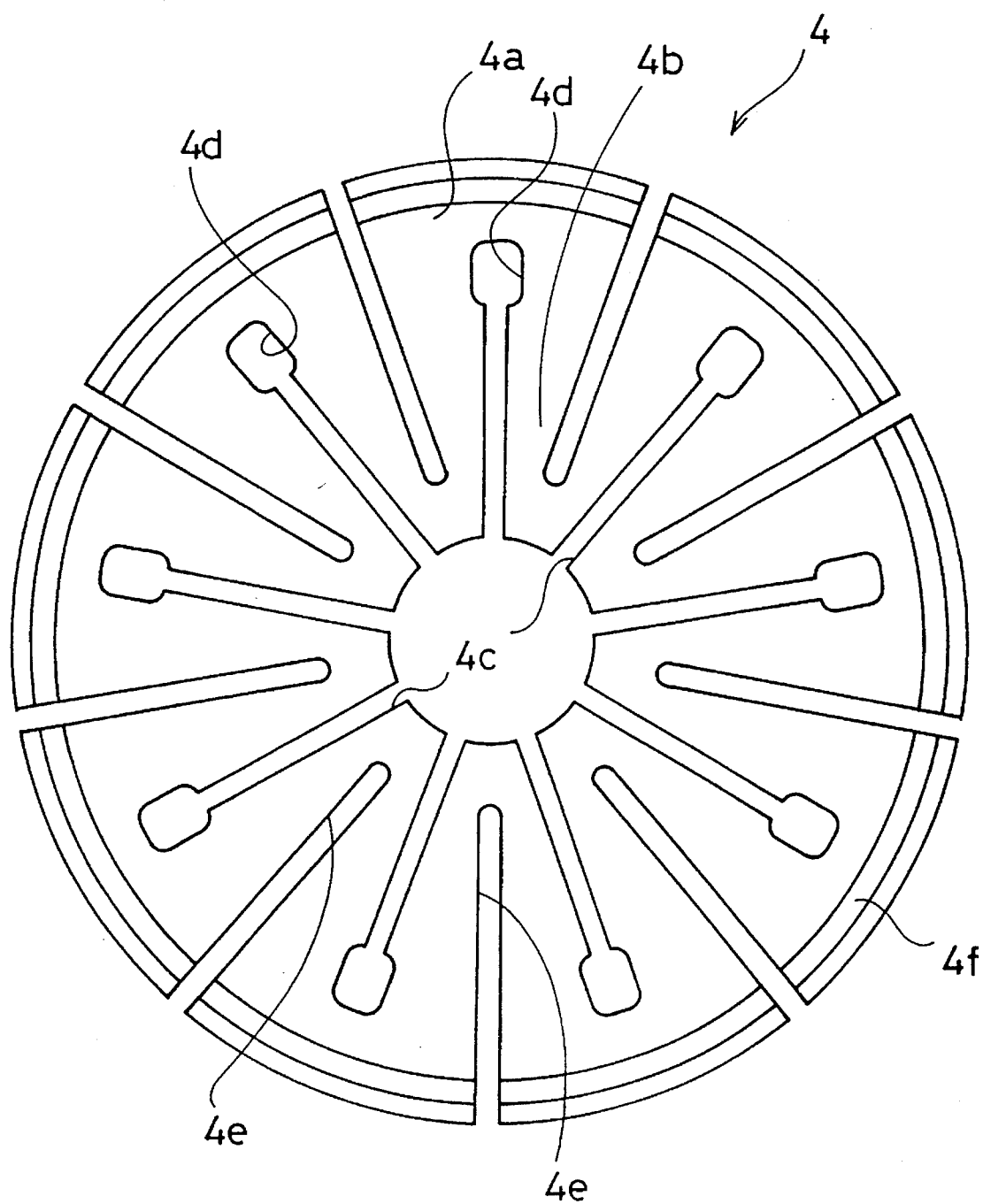
FIG. 3 is a plane view of a lever member.

Referring to FIG. 2 and FIG. 3, the clutch cover assembly 31 comprises a clutch cover 2 fixed to the flywheel 1, the pressure plate 3 located within the clutch cover 2, a washer-type spring 5 located within the clutch cover 2 for engaging the pressure plate 3 with the flywheel 1, and a lever member 4 for releasing the engaging load of the washer-type spring 5.

The pressure plate 3 is annular and is connected to the clutch cover 2 through strap plates (not shown). The pressure plate 3 is formed with a pressing surface 3a on the flywheel 1 side in order to clamp facings 6 of the clutch disc assembly 32 to the flywheel 1. Formed on the opposite lateral side of the pressure plate 3 is a plurality of protruding elements 3b having a certain circumferential space between themselves. A lever member 4 is a flat disc located concentric with the clutch cover 2. As shown in FIG. 3, the lever member 4 is composed of an annular outer periphery 4a and a plurality of lever portions 4b extending from the outer periphery 4a radially inward. The outer periphery 4a is in contact with the protruding elements 3b of the pressure plate 3, and the tips of the lever members 4b are in contact with a release bearing 35. The lever portions 4b are separated from each other by first slits 4c in which the radially outward ends are formed with holes 4d. Supporting portions 2a (FIG. 2) of the clutch cover 2 being bent radially inward portion are inserted into the holes 4d and support the lever member 4 by way of two wire rings 7 which serve as fulcrums of the lever member 4. A second sill 4e extending radially inward is formed in each of lever portions 4b so as to divide the outer periphery 4a. The outer periphery 4a is formed with an annular axially extending portion 4f.

As shown in FIG. 2, the washer-type spring 5, located within the clutch cover 2; the outer edge of which is supported by projection 2b formed in clutch cover 2 and the inner edge of which applies an engaging load on lever member 4 and pressure plate 3 through protruding element 4f of lever member 4.

In the above-mentioned structure, the washer-type spring 5 and lever member 4 are positioned such that engaging loads of both members are applied to the pressure plate 3 in parallel to engage the pressure plate 3.

The inner edge of the washer-type spring 5 applies an engaging load on the pressure plate 3 in contact with the outer periphery 4a of the lever member 4. When the release bearing 35 pushes the radially inward end of the lever member 4 toward the flywheel 1, the outer periphery 4a moves rightward in the figure and the engaging load of the washer-type spring 5 on the pressure plate 3 is released. The pressure plate 3 leaves the facings 6 by the strap plates (not shown) releasing the clutch engagement.

Figure 4:
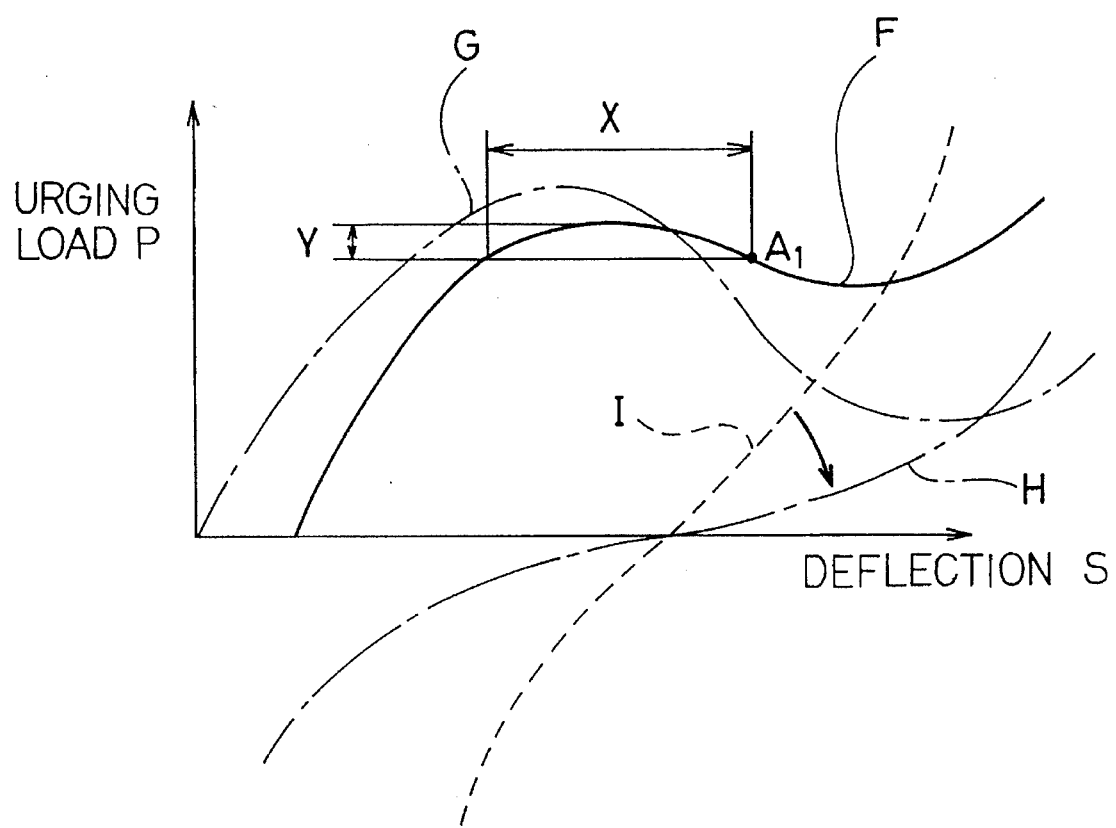
FIG. 4 is a diagram of load characteristics of the first embodiment.

Load characteristics of the clutch cover assembly 31 are represented in FIG. 4.

Line F represents load characteristics of the washer-type spring 5 and the lever member 4, wherein initial set load is $A_1$, allowable deflection is X, and load fluctuation is Y. The allowable deflection corresponds to wear allowance of the facings 6. If the allowable deflection becomes longer, life of the facings 6 can be lengthened. As apparent in FIG. 4, the allowable deflection X is greater and the load fluctuation Y is smaller than that of the prior art.

The line F is formed by combining line G, the load characteristics of washer-type spring 5, and line H, the load characteristics of lever member 4. The lever member 4 is formed with second slits 4e so that rigidity is lower than that of an ordinary lever. Line I represents load characteristics of the lever member 4 without the second slits 4e. If line I is combined with line G, suitable allowable deflection cannot be obtained. The shallow negative load of the lever member shown is line H acts on the spring to reduce load fluctuation. The shallow positive load of the lever member H acts with the below minimal engaging loads of the washer type spring from initial set stage into early deflection to lengthen allowable deflection. Consequently, load characteristics are better than that of the conventional washer-type spring 5.

Figure 5:
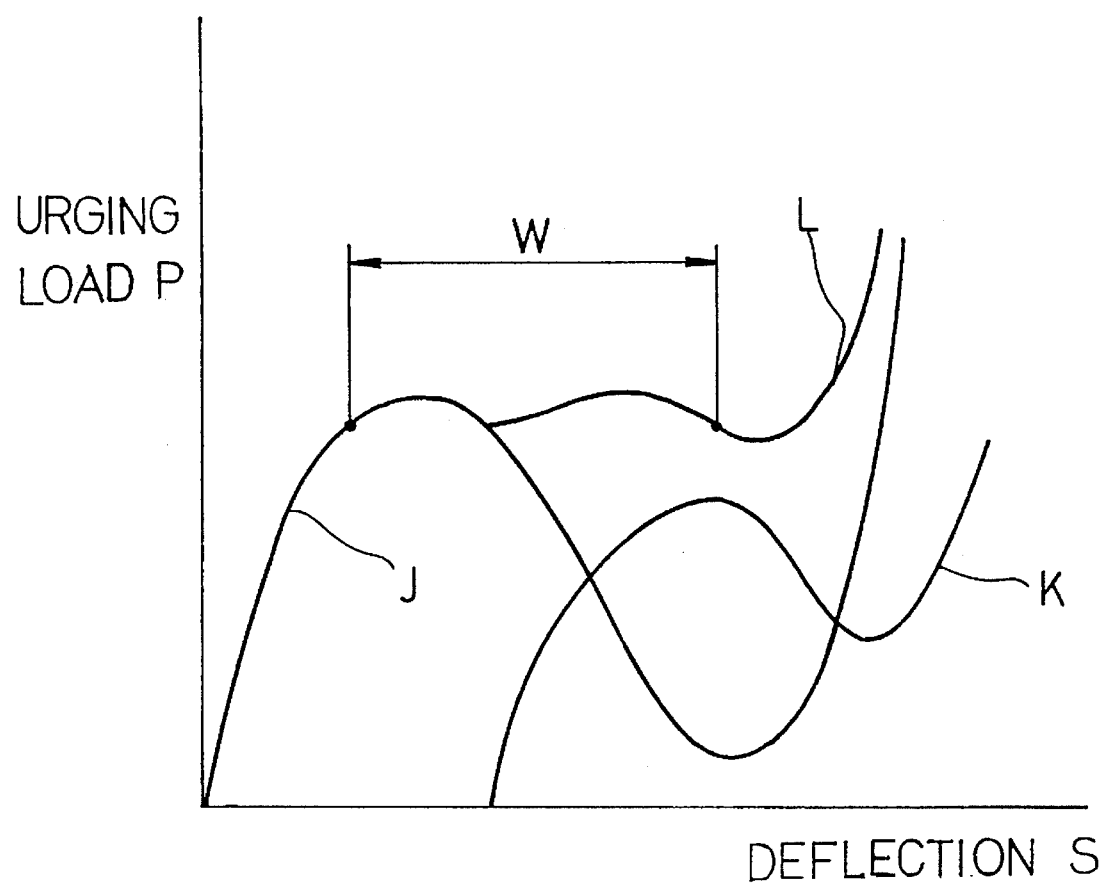
FIG. 5 is a diagram of a modification of the first embodiment, corresponding to FIG. 4.

Modifications (a) The lever member with lower rigidity in the first embodiment can be replaced by a diaphragm spring with ordinary load characteristics. The following is an explanation of the diaphragm spring employed in the structure of FIG. 2. This diaphragm spring has a larger H/T ratio wherein thickness is T and height is H. In FIG. 5, line J represents the load characteristics of the diaphragm spring, where peak load is high but valley load is not sufficient for engagement. The shallow and wide load characteristics of line L are obtained when load characteristics of the washer-type spring (line K) are combined with those of the diaphragm spring (line J). In the line L, the allowable deflection W (above 4 mm) greater than that of the prior art and the load fluctuation with respect to wear is ±10% of the initial set load of the prior art.

Figure 6:
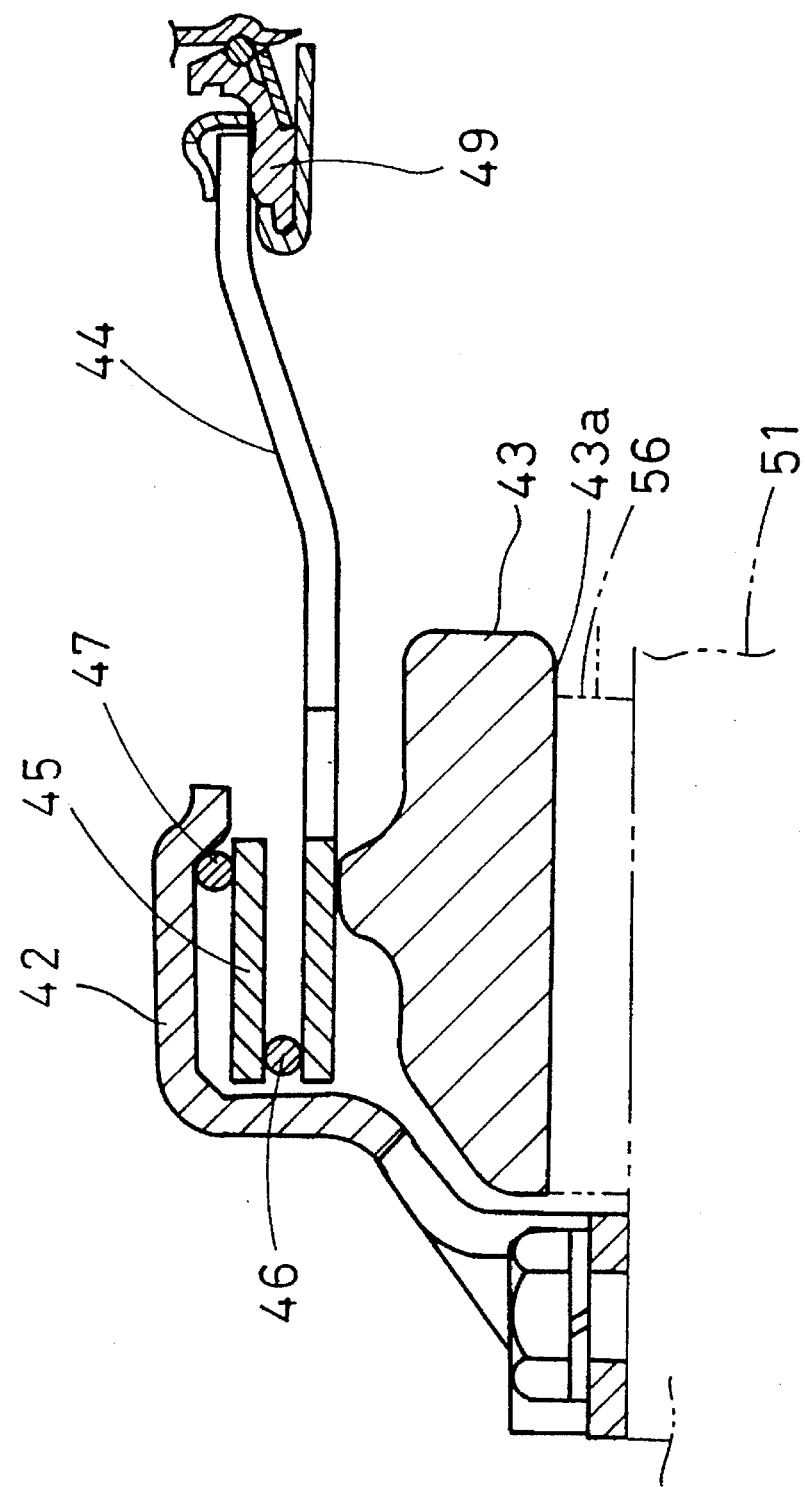
FIG. 6 is a cross-sectional view of a clutch cover assembly according to another modification of the first embodiment.

(b) A clutch cover assembly shown in FIG. 6 comprises a clutch cover 42 fixed to a flywheel 51, an annular pressure plate 43 formed with a pressing surface 43a for clamping facings 56 of a clutch disc (not shown) between the flywheel 51 and itself, a diaphragm spring 44 for engaging the pressure plate 43 to the flywheel 51, and a washer-type spring 45 located so as to press the pressure plate 43 in serial with the diaphragm spring 44.

Diaphragm spring 44 has a radially inner end engaged with a lever plate 49 of a release assembly (not shown), a radially outer end supported by an outer end of the washer-type spring 45 through a wiring 46, and a radially middle portion applying an engaging to load the pressure plate 43. When the lever plate 49 of the release assembly moves upward in the figure and pulls out the radially inward end of the diaphragm spring 44, the engaging load on the pressure plate 43 is released.

Figure 7:
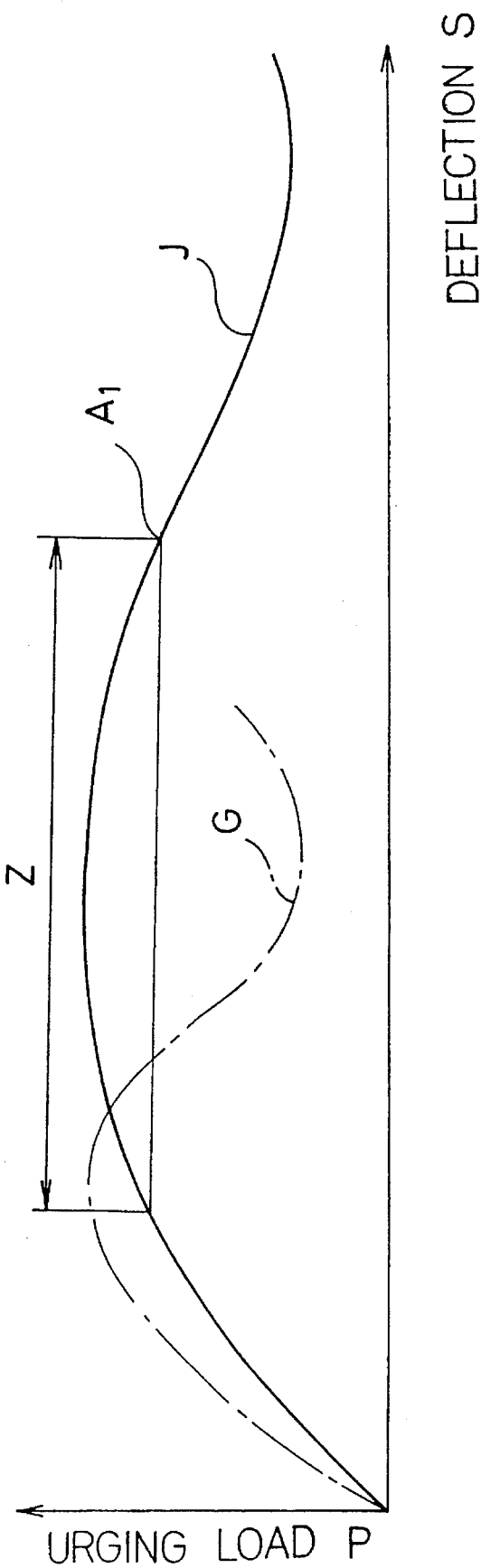
FIG. 7 is a diagram of the modification in FIG. 6, corresponding to FIG. 4.

The washer-type spring 45 has a radially inner end supported by the clutch cover 42 through a wire ring 47 and a radially outer end pressing the radially outer end of the diaphragm spring 44. That is, the washer-type spring 45 and the diaphragm spring 44 are located such that both engaging loads act on the pressure plate 43 in series. Consequently, the combined load represented by line J, as shown in FIG. 7, has allowable deflection two times greater than that of the one washer-type spring load represented by line G.

Figure 8:
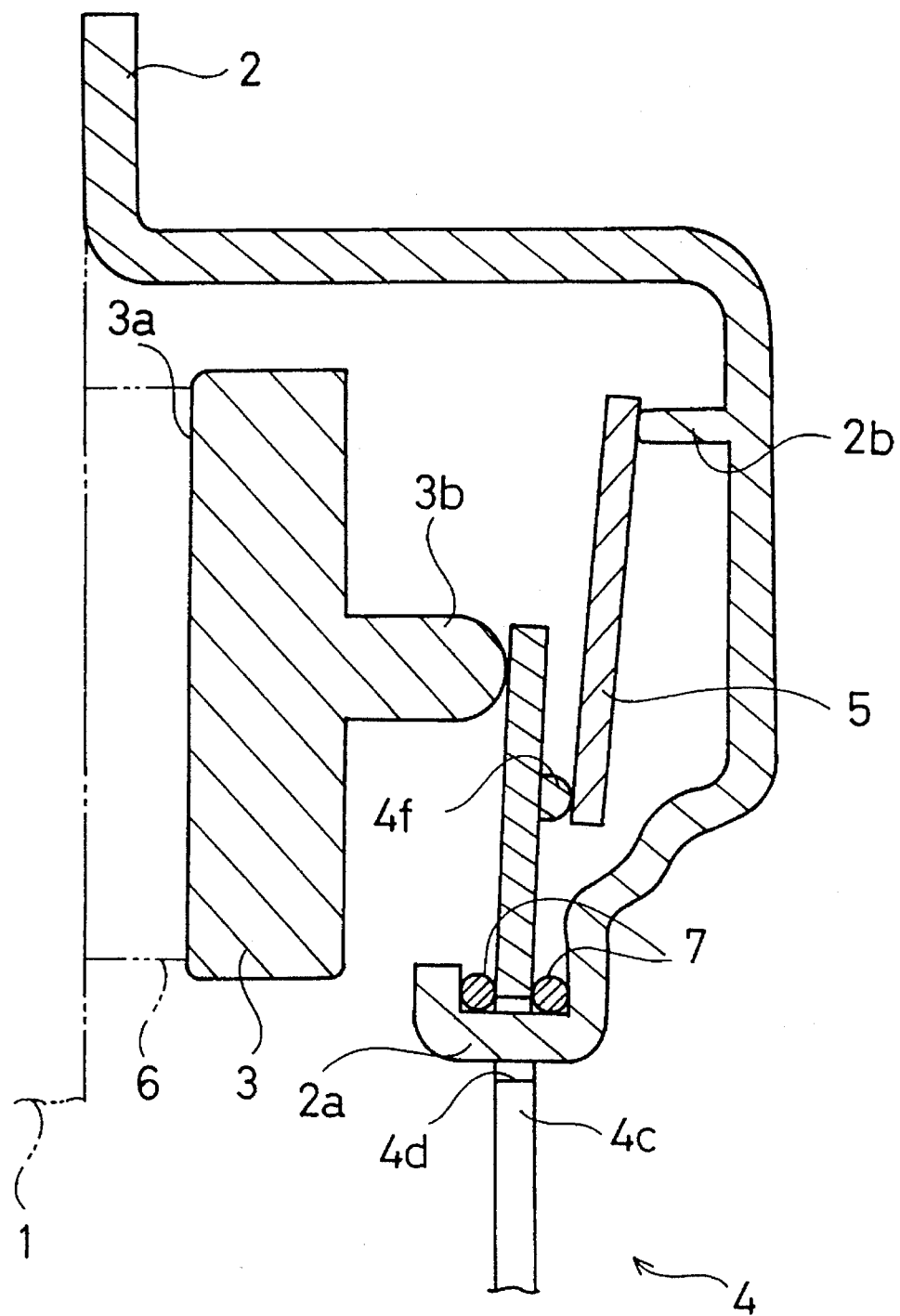
FIG. 8 is a view of a yet another modification, corresponding to FIG. 1.

(c) In the first embodiment, the inner end of the washer-type spring and the protruding element 3b of the pressure plate 3 are in alignment. It is, however, possible to position the contact projection 4f of the lever member 4 and the inner end of the washer-type spring 5 radially inward, away from the protruding element 3b as shown in FIG. 8. Leverage of the washer-type spring 5 may be larger, thereby relaxing design constraints on the washer-type spring 5.

Figure 9:
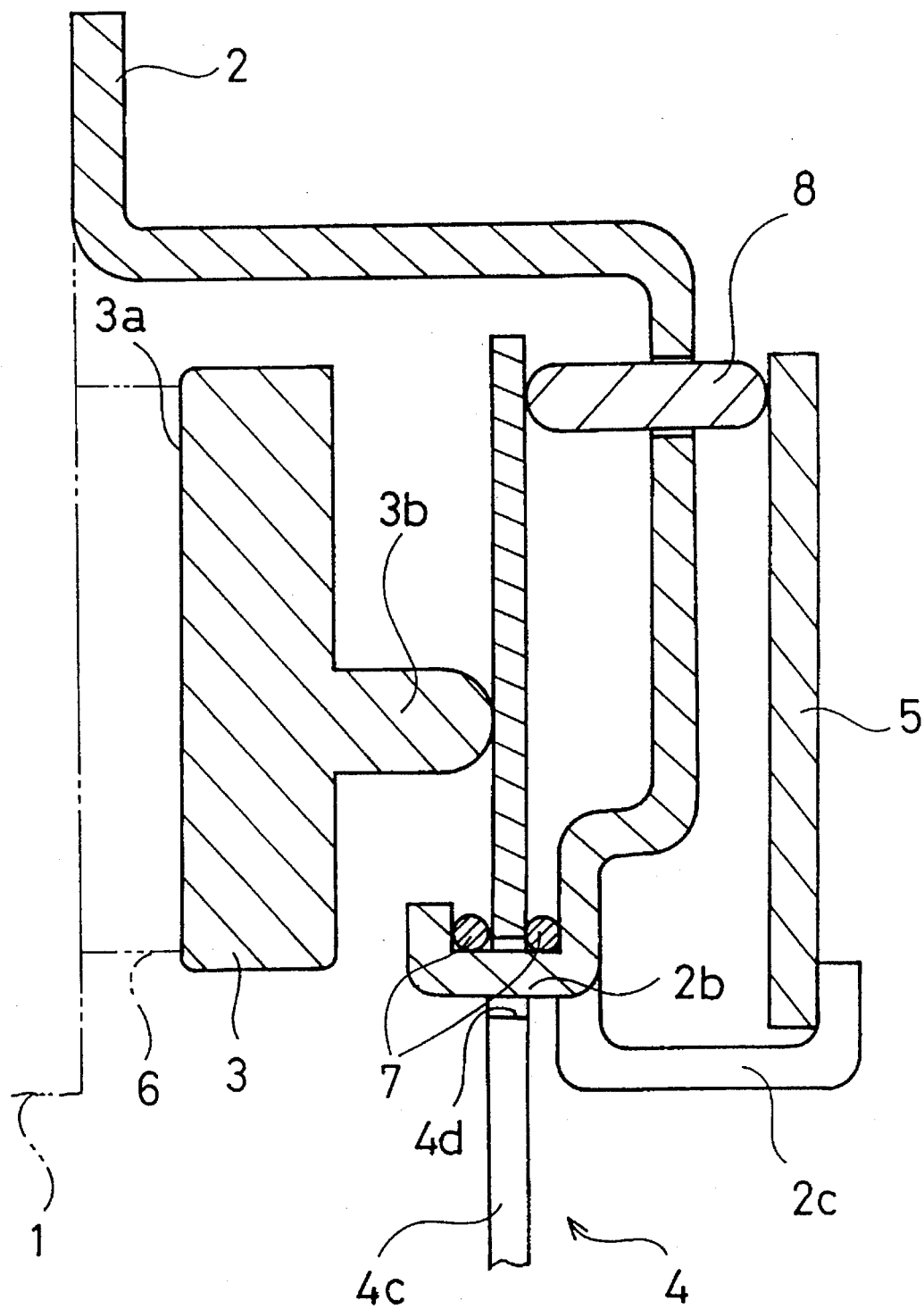
FIG. 9 is a view of still yet another modification, corresponding to FIG. 1.

(d) The washer-type spring 5 may be located outside of the clutch cover 2 as shown in FIG. 9.

In FIG. 9, the inner end of the washer-type spring 5 is supported by bent portions 2c cut and bent radially from the inner end of the clutch cover 2. The outer end of the washer-type spring 5 applies an engaging load on the radially outward end of the lever member 4 through a plurality of fulcrum springs 8 circumferentially located. The fulcrum springs 8 penetrate through holes formed in the clutch cover 2. In this modification, the outside diameter of the lever member 4 may be lengthened in order to lengthen the inside diameter. Since the space for the washer-type spring 5 is quite large, there is more freedom to design and choose the washer-type spring 5.

The Second Embodiment

Figure 10:
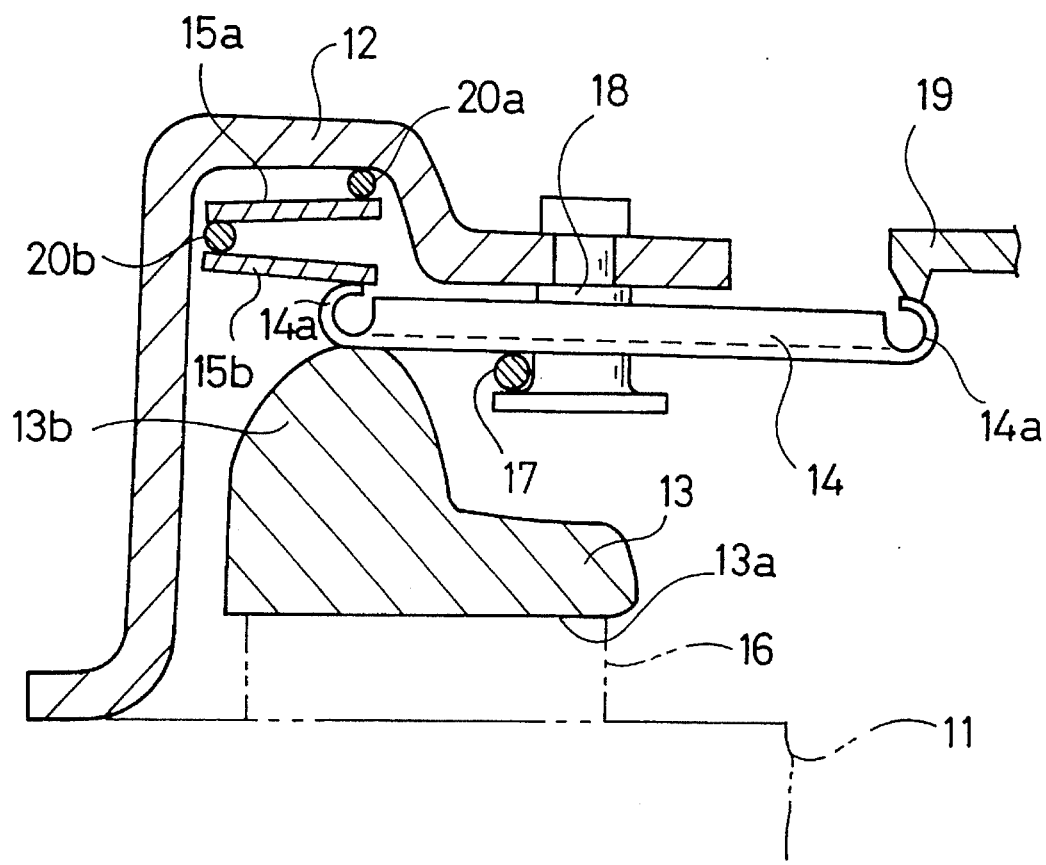
FIG. 10 is a view of the second embodiment, corresponding to FIG. 1.
Figure 11:
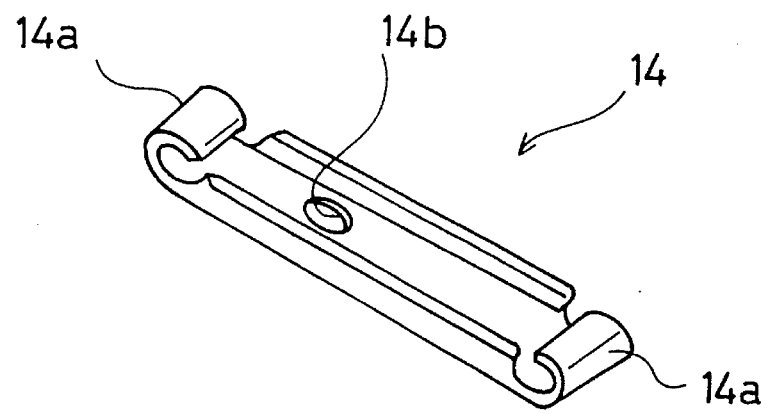
FIG. 11 is a perspective view of a release lever of the second embodiment.
Figure 12:
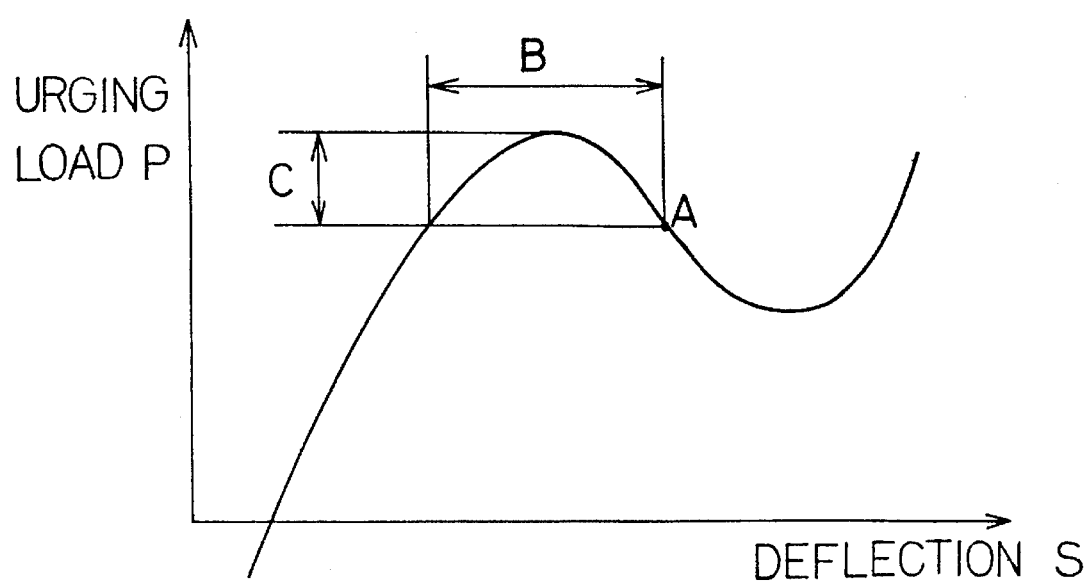
FIG. 12 is a view of a prior art clutch cover assembly, corresponding to FIG. 1.

A clutch cover assembly shown in FIG. 10 comprises a clutch cover 12 fixed to a flywheel 11 of the engine side, a pressure plate 13 located within the clutch cover 12, release levers 14 for separating the pressure plate 13 from the flywheel 11 side, and first and second washer-type springs 15a and 15b for engaging the pressure plate 13 to the flywheel 11.

The pressure plate 13 is annular and is connected to the clutch cover 12 by strap plates (not shown). The pressure plate 13 is formed with a pressing surface 13a on the flywheel 11 side in order to clamp facings 16 of the clutch disc to the flywheel 11. The pressure plate 13 is formed with protruding elements 13b on the lateral side, opposite the pressing surface 13a, which is in contact with one end of the release levers 14.

The release levers 14 are rectangular and located radially. Each of the release levers 14 is a sheet metal work with C-shaped sections. Both ends of the release lever 14 are rounded portions 14a. Each of the release levers 14 are formed with a hole 14b through which a stud pin 18 is fixed to the radially inward end of the clutch cover 12. The stud pins 18 support the release levers 14 through a wire ring 17 which serves as a fulcrum of the release lever 14. The radially outward ends of the release levers 14 are positioned between the inner edge of the second washer-type spring 15b and the protruding elements 13b of the pressure plate 13. A pressing member 19 of the release assembly (not shown) is in contact with the radially inward end of the release levers 14.

The first washer-type spring 15a and the second washer-type spring 15b are positioned in series and engage the radially outer circular portion 14a of the lever member 14 and the pressure plate 13 with the flywheel 11. A first wire ring 20a is located between the first washer-type spring 15a and the clutch cover 12. A second wire ring 25b is located between the first washer-type spring 15a and the second washer-type spring 15b. The inner edge of the first washer-type spring 15a is supported by the clutch cover 12 through the first wire ring 20a and its outer ends presses the outer edge of the second washer-type spring 15b through the second wire ring 20b. The inner edge of the second washer-type spring 15b presses the rounded portions 14a of the release levers 14.

As explained before, a plurality of washer-type springs are located to function in series so that deflection with respect to a certain level of load becomes larger and allowable deflection is widened. Load characteristics of this embodiment are similar to the load characteristics of line J in FIG. 7. Furthermore, the space for a necessary plurality of washer-type springs is not much larger than that necessary for conventional one washer-type spring.

Various details of the invention may be changed without departing from its spirit nor scope. Furthermore, the foregoing description of the embodiments according to the present invention is provided for the purpose of illustration only, and not for the purpose of limiting the invention as defined by the appended claims and their equivalents.

What is claimed is:

1. A clutch cover assembly, comprising:

a clutch cover rotationally coupled to a flywheel;

a pressure plate disposed between said clutch cover and said flywheel, said pressure plate having an annular friction surface adapted to apply an axial force to clamp at least one facing to said flywheel, said pressure plate having an element protruding from a side opposite said friction surface;

an elastic member positioned is said clutch cover to apply a first engaging load to said pressure plate; and a clutch release lever supported by said clutch cover and positioned to apply a second engaging load to said pressure plate, said release lever being a low-rigidity member applying said second engaging load on said protruding element of said pressure plate; and wherein said elastic member is a washer-type spring that one edge of said washer-type spring is supported by said clutch cover and a second edge of said washer-type spring opposite said one edge applies said first engaging load on said release lever at a point out of alignment with said protruding element of said pressure plate.

2. A clutch cover assembly according to claim 1, wherein said washer-type spring applies said first engaging load on said pressure plate such that said first engaging load and said second engaging load act on said pressure plate in parallel, whereby the resultant combined load characteristics has an allowable deflection larger than that of said second engaging load characteristics alone.

3. A clutch cover assembly according to claim 1, wherein said second edge is a radially inward edge and positioned radially inward from the pressing portion of said release lever.

* * * * *